United States Patent [19]

Thomassen et al.

[11] Patent Number: 5,355,838
[45] Date of Patent: Oct. 18, 1994

[54] METHOD FOR REMOVING PARASITES

[75] Inventors: Jan M. Thomassen, Bådalen; Odd-Ivar Lekang, Oslo, both of Norway

[73] Assignee: Eka Nobel AB, Bohus, Sweden

[21] Appl. No.: 127,530

[22] Filed: Sep. 28, 1993

[30] Foreign Application Priority Data

Oct. 2, 1992 [SE] Sweden ............................ 9202881-0

[51] Int. Cl.5 ............................................. A01K 1/00
[52] U.S. Cl. .................................................. 119/219
[58] Field of Search ............... 119/219, 215, 231, 243, 119/268

[56] References Cited

U.S. PATENT DOCUMENTS

| 4,064,048 | 12/1977 | Downs et al. |
| 4,260,286 | 4/1981 | Buchanan |
| 4,282,828 | 8/1981 | Johnson |
| 4,289,728 | 9/1981 | Peel et al. |
| 4,676,893 | 6/1987 | Travade et al. ............. 119/219 X |
| 4,926,795 | 5/1990 | Hamilton et al. |

FOREIGN PATENT DOCUMENTS

| 0035800 | 9/1981 | European Pat. Off. |
| 0347731 | 12/1989 | European Pat. Off. |
| 0141142 | 11/1980 | Japan |
| 1-317346 | 12/1989 | Japan |
| 3-108428 | 5/1991 | Japan |
| 648684 | 2/1979 | U.S.S.R. ........................ 119/219 |
| 782780 | 11/1980 | U.S.S.R. ........................ 119/219 |
| 1210254 | 11/1986 | U.S.S.R. |
| 319833 | 10/1929 | United Kingdom |
| 2195221A | 4/1988 | United Kingdom |

OTHER PUBLICATIONS

WPI Abstract 91-180883/25, Abstract of JP3108428, "Parasite Control of Fish by Suspending Container Containing Hydrogen Peroxide Carrier in Culturing Tank of Pond."
Chem. Abstracts, 113:36417g, vol. 113, 1990, "Hydrogen Peroxide for Ectoparasite Control on Cultured Marine Fish."
Chem. Abstracts, 115:87526r, vol. 115, 1991, "Control of Parasites on Fish with Hydrogen Peroxide."
Chem. Abstracts, vol. 116, 1992, 116:51548f, "Hydrogen Peroxide Preparation and Their use as Parasiticides or Bactericides in Seawater for Fish Culture."
WPI Abstract 91-300222/41, Abstract of JP030200705, "New Hydrogen Peroxide Formulation used in Water--Comprises Porous Support of Inorganic Material Impregnated with Aq. Hydrogen Peroxide Soln."
WPI Abstract 90-040628/06, Abstract of JP010317346, "Repelling Ectoparasite(s) for Salt Water Fish Culture-Comprises Washing Fish by Adding Hydrogen Peroxide to Closed Area and then Opening Shutter."
WPI Abstract 71-677015/42, Abstract of JP710035867, "Agent for Exterminating External Parasites of Fish."
WPI Abstract 67-00755H/00, Abstract of JP670023242, "Piscine Ectoparasiticides Con a Cpd. or Compn. of Phosphoric Acid Salts of Poly-(or Condensed)-Phosphoric Acid Salts with Hydrogen Peroxide, as a Main Component."

Primary Examiner—Gene Mancene
Assistant Examiner—Thomas Price
Attorney, Agent, or Firm—Burns, Doane, Swecker & Mathis

[57] ABSTRACT

The invention relates to a method for preventing fish-borne parasites from spreading to a watercourse (1) or a limited area (4) of a watercourse (1) without such parasites. According to the invention, all the fish to pass into the area (4) are forced to go through a bath of water containing an active substance which kills or removes from the fish the parasite or parasites which should be prevented from spreading, without killing or seriously injuring the fish. The invention also relates to a plant for carrying out the method.

10 Claims, 3 Drawing Sheets

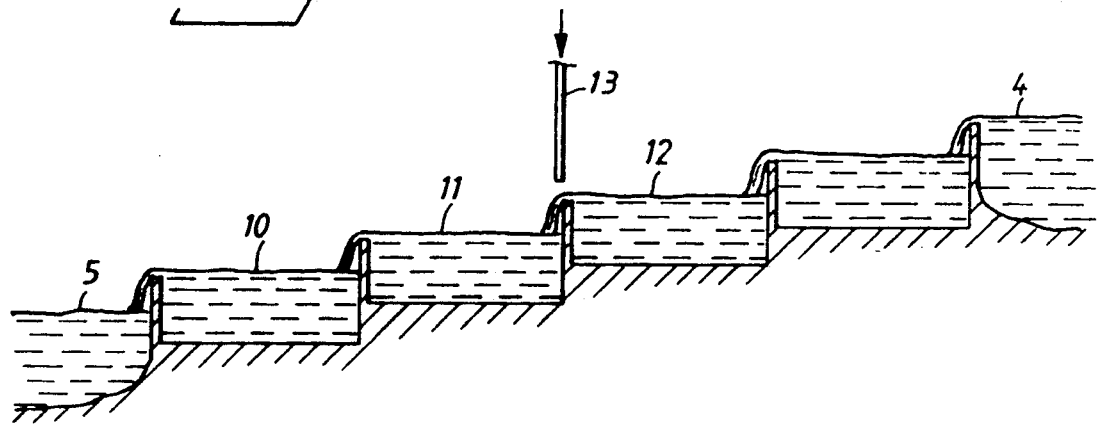
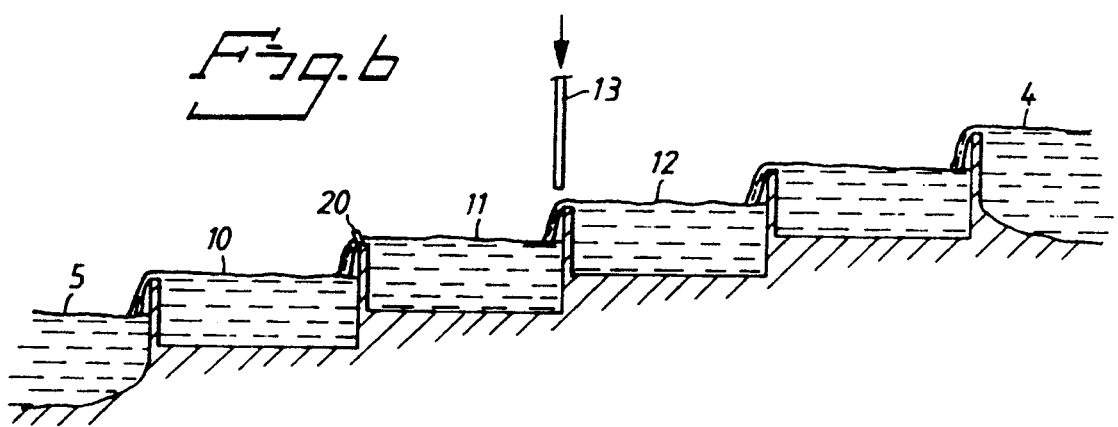
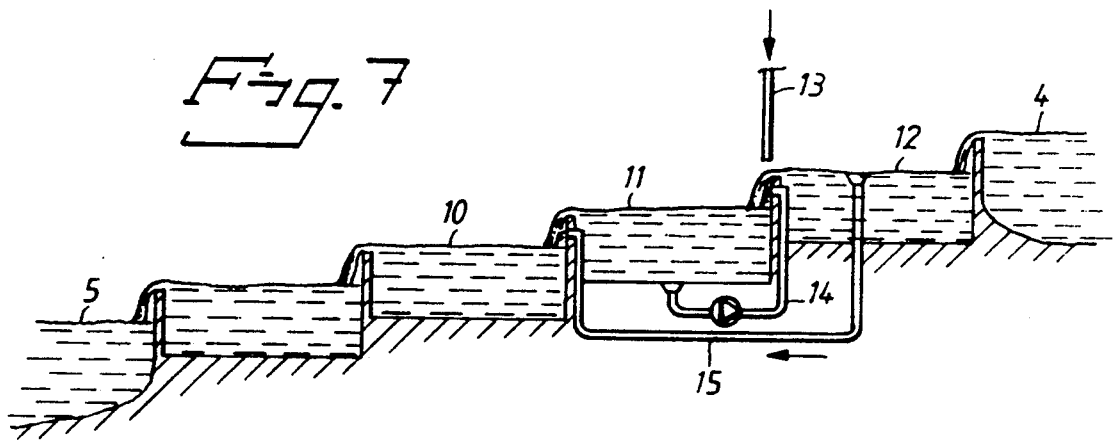

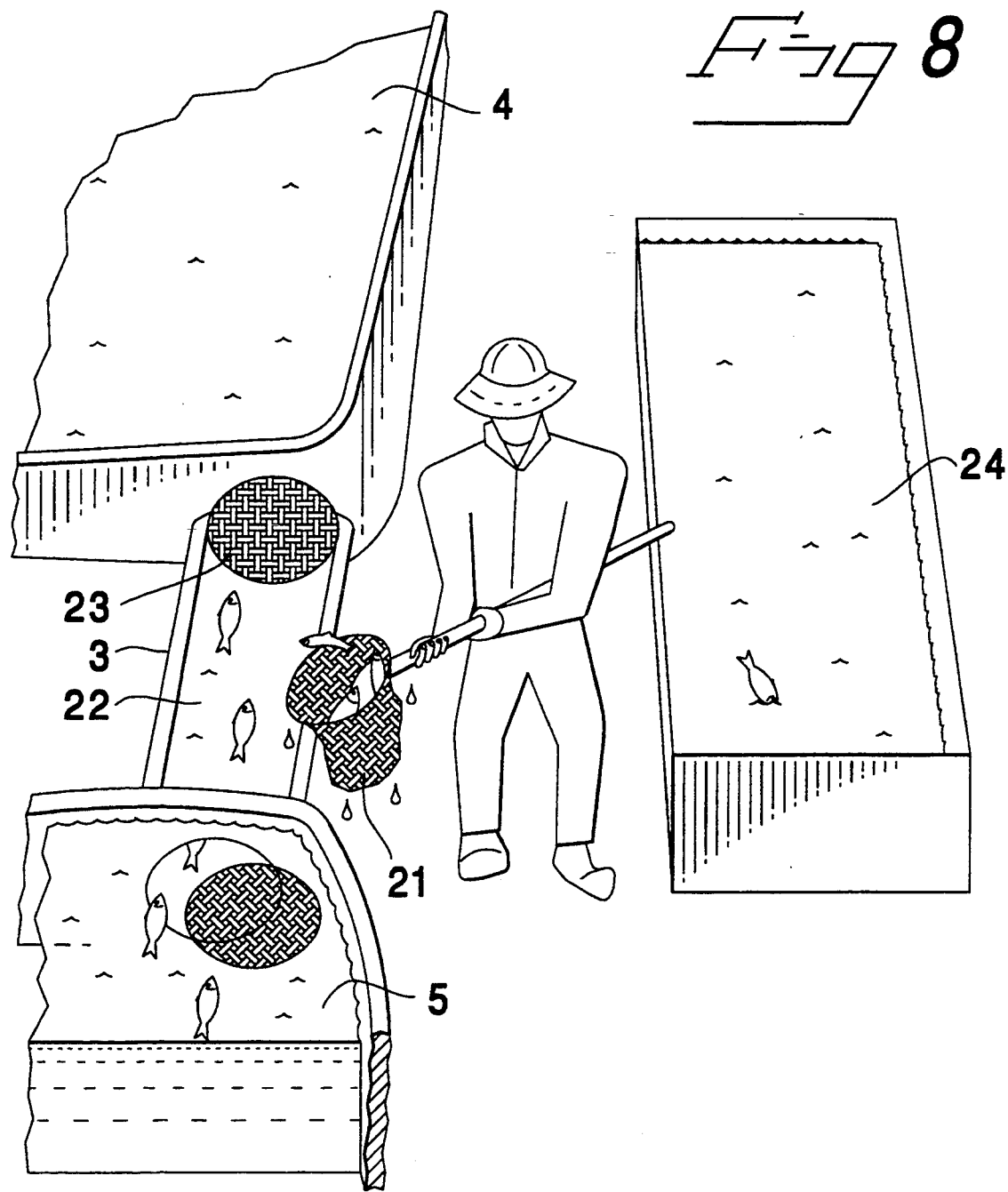

METHOD FOR REMOVING PARASITES

The present invention relates to a method for preventing fish-borne parasites from spreading to areas of waters without such parasites.

Fishes often serve as hosts for parasites. Salmonides are often affected by the parasite gyrodactilus which eats its way through the skin, this, in most cases, eventually causing the death of the fish. Gyrodactilus has become an ever greater problem in waters where it spreads quickly and eventually kills the whole population of salmonides. The absence of salmonides in many thinly-populated areas curtails the means of support while at the same time tourism is impoverished. Restoring affected waters has proved a difficult task, since it has required the use of highly toxic agents which have killed all the fish and made it necessary to put out new fish. It therefore is most desirable to prevent gyrodactilus from spreading to waters or parts of waters not yet affected by the parasite.

It has been found that gyrodactilus is spread by direct contact between fishes and that it is introduced in water-courses by fishes, especially salmonides, that go upstream from the sea. According to the invention, the spreading of fish-borne parasites to a watercourse or a limited area of a watercourse without such parasites, is prevented by causing all the fishes that are to pass into the area, to pass through a bath of water containing an active substance which kills or removes from the fish the parasite or parasites, the spreading of which should be prevented without killing or seriously injuring the fish. The term watercourse as used herein relates to both individual rivers and streams, and systems of communicating waters, for instance a river with tributaries and possible lakes connected to them. The inventive method is especially well suited for preventing the spreading of parasites borne by salmonides, since these ascend the watercourses from the sea. The method is especially well suited for preventing the spreading of gyrodactilus, but also, for example, of Costia parasites. The active substance preferably consists of hydrogen peroxide or compositions containing hydrogen peroxide, since it has been found that salmonides sustain relatively high doses while at the same time no environmentally harmful substances are spread.

It is necessary that no parasites that should be prevented from spreading can pass alive into the limited area while the fish should be able to do so without being seriously injured. The content of active substance in the bath and the dwelling time of the fish therein must be so controlled as to satisfy these requirements. It is preferred that the fish be subjected to an aqueous solution containing from about 0.5 to about 3 g of $H_2O_2$ per liter, especially from about 0.5 to about 1.5 g of $H_2O_2$ per liter, during a time of from about 5 to about 20 min, especially from about 5 to about 10 min. It is also possible to subject the fish to considerably higher contents of hydrogen peroxide for a shorter time, for instance an aqueous solution containing from about 10 to about 15 g of $H_2O_2$ per liter during a time of from about 1 to about 3 min.

According to a preferred method, the fish are forced to pass through a channel or a ladder comprising a portion with water containing the required amount of active substance. The length of this portion is so determined that the fish are forced to dwell there for a sufficient time to remove all undesired parasites. The active substance can be dosed continuously or batchwise. Dosage can be started manually or automatically by means of a detector, for instance a photocell or other optical device, which records the passage of fish and triggers a dosing pump for the active substance. A ladder may be designed as a conventional salmon ladder where the water in one or more of the steps is supplied with the active substance. To reduce the consumption of active substance, the water in one step where the active substance is supplied can be recycled while the water in the step upstream thereof is conducted past the step with water containing active substance, directly to the step downstream thereof. Instead of dosing the active substance directly to a channel or ladder, it is possible to gather the fish in a trap or a confined fish basin and to manually transfer it to a bath with active substance and eventually put it in the part of the watercourse which is free from the parasite or parasites concerned.

According to one embodiment, a cross-sectional area of the watercourse can be provided with a barrier which cannot be passed by the fish, and with a passage, for instance a channel or a ladder, which the fish can only pass if going through the bath with the active substance. The barrier preferably lets water through, so that the flow of the watercourse is not prevented to any major extent. For instance, the barrier may be a netting or a grating. However, the barrier may also be a dam, for instance an existing dam of a power plant, where the water flows through special channels.

According to another embodiment, the main part of the water flow of the watercourse is caused to flow through a furrow having such a small cross-sectional area that the flow rate becomes too high for the fish to pass through, at the same time as the watercourse is provided with a passage through which the fish can only pass if going through a bath with the active substance, for instance a ladder or a channel. Preferably, the cross-sectional area of the watercourse is reduced by making the furrow narrower, although it is also possible to reduce the depth.

The restriction of a watercourse can be made at or adjacent to the mouth thereof or in any other place where it is practically convenient. It is however essential that the confined area is free from the parasite or parasites that should be prevented from spreading, for instance gyrodactilus.

The present invention also relates to a plant for preventing fish-borne parasites from spreading to a watercourse or a limited area of a watercourse. The plant comprises a device for forcing all the fish to pass into the area to go through a bath of water containing an active substance which kills or removes from the fish the parasite or parasites concerned, without killing or seriously injuring the fish. The device suitably comprises means for completely preventing fish from passing into the limited area, and a passageway through which the fish can only pass if going through the bath with the active substance. The passageway may comprise a channel or a ladder having a portion where the water contains the active substance in a suitable concentration. Alternatively, the passageway may comprise a trap or a basin from which the fish can be manually transferred to a bath with the active substance, and then be let out on the other side. If the passageway comprises a ladder, one or more of the steps thereof may comprise a dosing device for the active substance. Preferably, this step also comprises means for recycling the water, while the steps upstream and downstream thereof comprise means for conducting the water past the step containing the active substance. The means for completely preventing the fish from passing into the limited area, may consist of a barrier, preferably one that lets water through, such as a netting or a grating. Such a means may also consist of means for reducing the cross-sectional area of the watercourse, such that the flow rate of the water becomes too high for the fish to pass through. As to the remaining details and possible embodiments, reference is made to the description of the method according to the invention.

The invention will be described in more detail with reference to the accompanying schematic drawing figures.

FIGS. 3 and 4 show from the side and from above, respectively, a device for subjecting a fish to an active substance, while FIGS. 5–7 show different variants of fish ladders from the side.

FIG. 8 shows an arrangement wherein the fish are gathered in trap or a confined basin and are manually transferred to a bath 24 containing the active substance.

Figure 1:
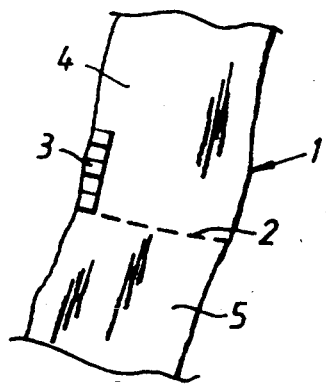
FIGS. 1 and 2 show from above an arrangement for forcing the fish to pass along a channel or a ladder.

FIG. 1 shows a watercourse 1, for instance a river, provided with a barrier 2 in the form of a netting or a grating which lets water through and which divides the watercourse 1 into an area 4 free from e.g. gyrodactilus, and an area 5 where the parasite may occur. Since the fish cannot pass through the barrier 2, they can only pass into the noninfected area 4 through the passageway 3 where it is subjected to an active substance, preferably hydrogen peroxide. The passageway 3 may be a channel or a ladder where the active substance is dosed, but it may also comprise a trap or a basin from which the fish can be manually transferred to a bath with active substance. Since salmonides go upstream from the sea, the parasite-free area 4 is generally situated upstream of the area 5.

Figure 2:
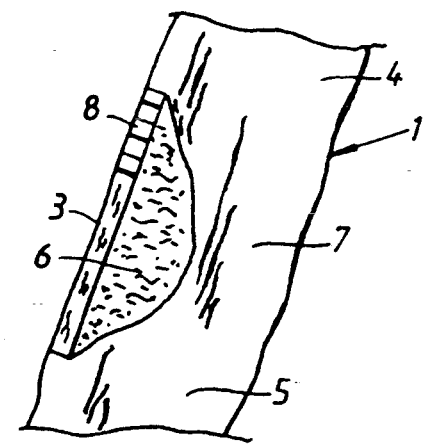

FIG. 2 shows how the cross-section of the watercourse 1 has been constricted by making the area 6 dry, e.g. by a filling. As a result, the rate of flow in the area 7 will become too high for the fish to pass through it against the current from the area 5, into the parasite-free area 4, but the fish must go through the passageway 3 where it is subjected to a bath with the active substance, preferably comprising a ladder 8.

Figure 3:
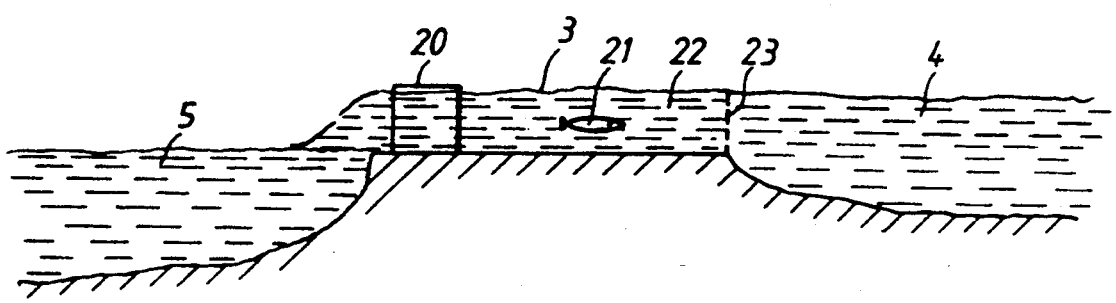
Figure 4:
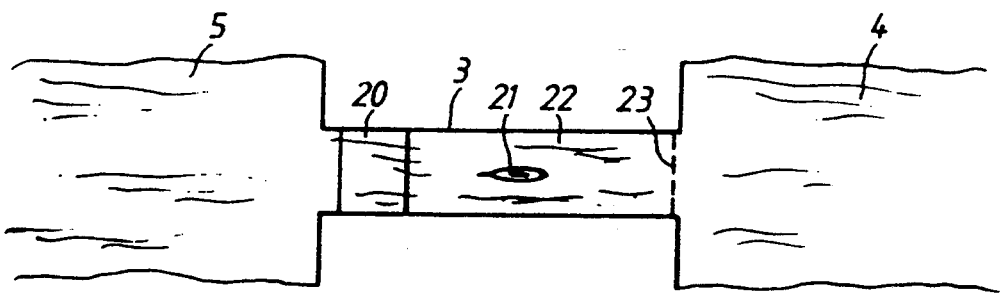

FIGS. 3 and 4 show a channel 3 running between an area 5 of a watercourse, and a parasite-free area 4. A fish 21 that is to move into the parasite-free area 4 must pass a detector 20, for instance a photocell. When the fish swims further on, it eventually comes to a grating 23, and when encountering it, a mechanism is triggered which lowers walls behind and optionally also in front of the fish 21 so as to form a cage 22, in which the active substance is added. The consumption of active substance becomes less if the walls of the cage 22 do not allow water to pass through. After the required treatment time, the cage, including the grating 23, is opened, such that the fish 21 can swim further on into the parasite-free area 4. This type of cage can also be used for confining fish which should be transferred manually to a bath with active substance.

FIG. 5 shows a ladder which may be included in a passageway for the fish. This ladder comprises a plurality of steps 10, 11, 12 designed as pools and containing water from the watercourse, which flows through the ladder from the parasite-free area 4 to the area 5 downstream thereof. The active substance is added to one of the steps 11 through the conduit 13.

FIG. 6 shows a similar ladder with a single modification, namely that a detector 20 is provided at the step 11 to which the active substance is supplied. Thus, this substance has only to be added when the detector 20 indicates that a fish is on its way upstream.

FIG. 7 shows a modified variant of a ladder including recycling of active substance, which is supplied to the step 11 through the conduit 13. The water in this step 11 is recycled through the conduit 14, while the water from the upstream step 12 by-passes the step 11 and is conducted through the conduit 15 to the step 10 downstream thereof.

We claim:

1. A method for preventing fish-borne parasites from spreading to a watercourse or a limited area of a watercourse without such parasites comprising:

forcing all fish which are going to pass into the watercourses or limited area of a watercourse to pass first through a bath of water containing an active substance which kills or removes the fish-borne parasites without killing or seriously injuring the fish.

2. The method of claim 1, wherein the fish are forced to pass through a channel or a ladder having a portion with water containing the active substance.

3. The method of claim 2, wherein the ladder further comprises at least one step containing water located upstream and at least one step containing water located downstream from the portion of the ladder having water containing the active substance, wherein the water containing the active substance which flows out of the portion of the ladder containing the active substance is recycled back to the portion of the ladder containing the active substance and the water in the step upstream from the portion of the ladder with water containing the active substance is conducted directly to the step containing water located downstream of the portion of the ladder containing the active substance.

4. The method of claim 1, wherein the fish are gathered in a trap or a confined basin and are manually transferred to a bath with water containing the active substance.

5. The method of claim 1, wherein a cross-sectional area of the watercourse is provided with a barrier through which the fish cannot pass, and with a passageway through which the fish can only pass by going through the bath of water containing an active substance.

6. The method of claim 1, wherein a main part of the water volume of the watercourse is caused to flow through a furrow having such a small cross-sectional area that the flow rate becomes too high for the fish to pass through, while at the same time the watercourse is provided with a passageway through which the fish can only pass if going through the bath of water containing the active substance.

7. A plant for preventing fish-borne parasites from spreading to a watercourse or a limited area of a watercourse, comprising: forcing the fish which are going to pass into the watercourse or limited area to first go through a bath containing an active substance which kills or removes the fish-borne parasites from the fish without killing or seriously injuring the fish.

8. The plant of claim 7, further comprising means for completely preventing the fish from passing into the limited area and a passageway through which fish can only pass by going through the bath of water containing the active substance.

9. The plant of claim 8, wherein the means for preventing the fish from passing into the limited area comprises a barrier.

10. The plant of claim 8, wherein the passageway comprises a ladder having a plurality of steps containing water and means for recycling the water therein, wherein one of the steps of the ladder comprises a dosing device for supplying the active substance to the water in that step and the steps located upstream and downstream of the means for recycling the water comprise means for conducting water past the step containing the active substance.

* * * * *